United States Patent [19]

Nakamura et al.

[11] Patent Number: 4,461,852

[45] Date of Patent: Jul. 24, 1984

[54] PHENOLIC RESIN FOAM AND PROCESS FOR PRODUCING THE SAME

[75] Inventors: Tsutomu Nakamura, Saitama; Akira Kuroda, Narashino; Masatoshi Onishi, Yokohama; Tetsuo Sasaki, Tokyo, all of Japan

[73] Assignee: Hodogaya Chemical Co., Ltd., Tokyo, Japan

[21] Appl. No.: 512,776

[22] Filed: Jul. 11, 1983

[30] Foreign Application Priority Data

Sep. 7, 1982 [JP] Japan ................................ 57-154618
Apr. 22, 1983 [JP] Japan ................................ 58-69970

[51] Int. Cl.$^3$ .......................... C08G 18/32; C08J 9/00
[52] U.S. Cl. .................................... 521/121; 521/128; 521/136; 521/181; 521/177
[58] Field of Search .............. 521/181, 136, 128, 121

[56] References Cited

U.S. PATENT DOCUMENTS 3,485,797 12/1969 Robins .................................. 526/71
4,390,641 6/1983 Smith .................................. 521/103

*Primary Examiner*—Morton Foelak
*Attorney, Agent, or Firm*—McAulay, Fields, Fisher, Goldstein & Nissen

[57] ABSTRACT

A phenolic resin foam having excellent mechanical strength and flame resistance is obtained by letting a resinous mixture comprising a benzylic ether type phenolic resin, a blowing agent, an aromatic sulfonic acid, a polyisocyanate compound, and water to stand at room temperature or more so as to allow the mixture to foam and solidify.

19 Claims, No Drawings

PHENOLIC RESIN FOAM AND PROCESS FOR PRODUCING THE SAME

BACKGROUND OF THE INVENTION

1. Field of the Invention

The present invention relates to a phenolic resin foam and a process for producing the same. More particularly, the present invention relates to a benzylic ether type phenolic resin foam and a process for producing the same.

2. Description of the Prior Arts

It is known that conventional phenolic resin foam exhibits excellent heat resistance and flame resistance and a low smoke-generating property. Conventional phenolic resin foam is, however, disadvantageous of its high friability and brittleness as compared with other resin foams, such as polyurethane foams and polystyrene foams. Additionally, conventional resol resin per se exhibits poor chemical stability during storage thereof, and novolak resin is difficult to handle as it is a solid. Therefore, the demand for conventional phenolic resin foam is not increasing appreciably at present.

It is also known to prepare phenolic resin foam from benzylic ether type phenolic resin. While this resin per se exhibits satisfactory stability for storage, the use of benzylic ether type phenolic resin is disadvantageous in that when it is mixed with a hardening agent, the hardening reaction proceeds at an extremely fast rate with generation of undesirable exothermic heat and bubbles. Also, the resultant foam has a low density and a high friability and, therefore, is useless as a practical heat-insulating material.

Japanese Examined Patent Publication (Kokoku) No. 55-27093 discloses a process for producing a polyurethane foam by the reaction of a benzylic ether type phenolic resin with a diisocyanate compound in the absence of a promotor. The resultant foam, however, exhibits a poorer flame-retarding property and a higher smoke-generating property than conventional phenolic resin foam.

SUMMARY OF THE INVENTION

An object of the present invention is to provide a new type of phenolic resin foam having not only satisfactory heat resistance and flame resistance and a reduced smoke-generating property comparable to conventional phenolic resin foam, but also enhanced mechanical strength, and to provide a process for producing the same.

The above-mentioned object can be attained by the phenolic resin foam of the present invention, which comprises a reaction product of a mixture comprising: (A) at least one benzylic ether type phenolic resin; (B) a blowing agent; (C) a hardening agent comprising at least one aromatic sulfonic acid component; (D) a polyisocyanate component consisting of at least one polyisocyanate compound; and (E) water.

The above-mentioned phenolic resin foam can be produced by the process of the present invention, which comprises: (A) mixing at least one benzylic ether type phenolic resin with a blowing agent and then with at least a hardening agent comprising at least one aromatic sulfonic acid compound, a polyisocyanate component consisting of at least one polyisocyanate compound, and water; and (B) letting the mixture stand at room temperature or higher to allow the mixture to foam and solidify.

DESCRIPTION OF THE PREFERRED EMBODIMENTS

The phenolic resin foam of the present invention comprises a reaction product of a resinous mixture comprising at least one benzylic ether type phenoric resin, a blowing agent, a hardening agent, a polyisocyanate component, and water.

The resinous mixture contains at least one benzylic ether type phenolic resin. The benzylic ether type phenolic resin usable for the present invention can be selected from those of the formula (I):

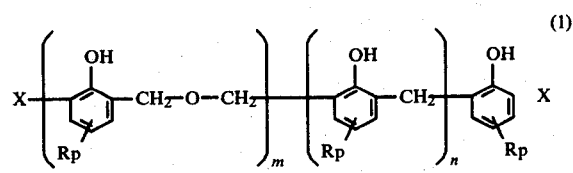

wherein R represents a member selected from the group consisting of a hydrogen atom, hydrocarbon radicals, oxyhydrocarbon radicals, and halogen atoms; X represents a terminal group selected from the group consisting of a hydrogen atom and methylol radical, the molar ratio of the methylol terminal group to the hydrogen terminal group being at least one, and m and n each represent an integer, respectively, the sum of m and n being at least 2 and the ratio of m to n being at least 1, and p represents an integer from 1 to 3.

The benzylic ether type phenolic resin of the formula (1) can be prepared by the method as disclosed in U.S. Pat. No. 3,485,797. That is, the benzylic ether type phenolic resin can be prepared by condensing a phenol compound of the formula (2):

wherein R and p are the same as defined hereinbefore, and R is located meta or para to the phenolic hydroxyl group, with an aldehyde compound of the formula (3):

R'CHO (3)

wherein R' represents a member selected from the group consisting of a hydrogen atom and hydrocarbon radicals having 1 to 8 carbon atoms, in a molar ratio of the phenol compound to the aldehyde of from 1:1 to 1:3, in the presence of a catalyst consisting of a divalent metal salt.

In the formulae (1) and (2), R may be a hydrogen atom; a hydrocarbon radical, for example, methyl, ethyl, butyl, or octyl; a oxyhydrocarbon radical, for example, methoxy, ethoxy, butoxy; or a halogen atom, for example, chlorine, bromine, or fluorine.

The blowing agent usable for the present invention preferably comprises at least one member selected from the group consisting of aliphatic hydrocarbons and their halides having a low boiling point of 85° C. or less. For example, the blowing agent may comprise one or more members selected from the group consisting of petroleum ether, n-hexane, n-heptane, methylene chloride, trichloromonofluoromethane, and dichlorodifluoromethane.

The hardening agent usable for the present invention comprises at least one aromatic sulfonic acid compound, which can be selected from the group consisting of, for example, benzene sulfonic acid, toluene sulfonic acid, xylene sulfonic acid, and phenol sulfonic acid.

The hardening agent may contain a small amount, for example, from 0.1% to 30% by weight, of one or more inorganic acids, for example, phosphoric acid, sulfuric acid, and hydrochloric acid, in addition to the aromatic sulfonic acid.

Usually, it is preferable that the hardening agent be used in the form of an aqueous solution thereof in a concentration of, for example, from 10% to 99%.

The polyisocyanate component usable for the present invention consists of at least one polyisocyanate compound. The polyisocyanate compound can be selected from the group consisting of aliphatic, cycloaliphatic, and aromatic polyisocyanates, for example, polymethylenepolyphenylisocyanates, for example, a crude 4,4'-diphenylmethane diisocyanate; tolylene diisocyanate; hexamethylene diisocyanate; and prepolymers of at least one of the above-mentioned polyisocyanates with at least one polyol compound selected from the group consisting of polyhydric alcohols, polyether polyols, and polyester polyols. The prepolymer molecules have isocyanate radicals located at the terminals thereof.

In the resinous mixture, it is preferable that the polyisocyanate component and the hardening agent be in amounts satisfying the relationship:

$$0.1 \leq [NCO]/[SO_3H] \leq 1.0$$

wherein [NCO] represents a gram equivalent of NCO groups in the polyisocyanate compound molecules and [SO$_3$H] represents a gram equivalent of SO$_3$H groups in the aromatic sulfonic acid compound molecules. It is preferable that the ratio [NCO]/[SO$_3$H] be in the range of from 0.3 to 0.9.

If the gram equivalent ratio [NCO]/[SO$_3$H] is less than 0.1, the resultant foam sometimes has an excessively low density and exhibits a high friability and large shrinkage. When the ratio [NCO]/[SO$_3$H] is more than 1.0, the resultant sometimes foam is uneven in density and useless for practical use.

Usually, the polyisocyanate component in the mixture is in an amount of from 1 to 50 parts by weight, preferably from 3 to 25 parts by weight, per 100 parts by weight of the benzylic ether type phenolic resin.

Usually, the aromatic sulfonic acid compound contained in the resinous mixture is in an amount of from 5 to 150 parts by weight, preferably 10 to 85 parts by weight, per 100 parts by weight of the benzylic ether type phenolic resin.

It is preferable that the water contained in the resinous mixture be in an amount of from 0.1 to 100 parts by weight, more preferably from 4 to 45 parts by weight, per 100 parts by weight of the benzylic ether type phenolic resin.

In the resinous mixture, the blowing agent is contained in an amount necessary for obtaining a desired density of the foam, preferably, in an amount of from 1 to 50 parts by weight, more preferably from 5 to 40 parts by weight, per 100 parts by weight of the benzylic ether type phenolic resin.

The phenolic resin foam can contain one or more additives selected from surfactants, inorganic fillers, pigments, agents for enhancing mechanical properties of the resultant foam, and flame retardants which are effective for enhancing heat resistance and flame resistance and for reducing the smoke-generating property of the resultant foam.

The surfactants are selected preferably from nonionic surfactants, for example, polydimethylsiloxane-polyalkyleneoxide block polymers and vinylsilane-polyoxyalkylene polyol copolymers and are preferably in an amount of 1 to 5 parts by weight per 100 parts of weight of the benzylic ether type phenolic resin.

The mechanical property-enhancing agent may contain one or more members selected from polyol compounds, for example, ethylene glycol, propylene glycol, and glycerol; polyoxyalkylene polyol compounds, for example, polyoxyethyleneglycol and polyoxypropyleneglycol; nitrogen-containing compounds, for example, diethanolamine, triethanolamine, diethanoltriamine, and urea and is used, preferably, in an amount of from 2 to 30 parts by weight per 100 parts by weight of the benzylic ether type phenolic resin.

The flame retardant may contain one or more members selected from aluminum hydroxide, antimony trioxide, and tris-($\beta$-chloropropyl) phosphate.

The phenolic resin foam of the present invention is produced by mixing the afore-mentioned phenolic resin with the blowing agent and then with at least the hardening agent, polyisocyanate component, and water and, optionally, the additive, while vigorously stirring it and by allowing the mixture to stand to allow the mixture to foam and solidify. The mixing operation is carried out at an ambient temperature, preferably, from 10° C. to 50° C. by means of a stirrer.

Usually, the resultant mixture is cast in a mold, and the cast mixture is left to stand without stirring so as to allow the mixture to foam and solidify.

The foaming and solidifying procedure is carried out at ambient temperature or higher, preferably, from 60° C. to 80° C., for a time period necessary to complete the foaming and solidifying reaction of the mixture. In this foaming and solidifying procedure, the higher the temperature, the shorter the necessary time period.

In the process of the present invention, the hardening agent is usually used in the state of an aqueous solution.

The phenolic resin foam of the present invention exhibits a significantly reduced friability and brittleness due to the presence of the polyisocyanate component and the benzylic ether type phenol resin. Also, the phenolic resin foam of the present invention has a rigid surface layer and an excellent bonding property to other materials. Furthemore, the phenolic resin foam of the present invention exhibits a satisfactory flame resistance and reduced smoke generation when burnt.

Accordingly, the phenolic resin foams of the present invention can be laminated on and bonded to each other to form a body of laminate. This type of laminate cannot be produced from conventional resol or novolak type phenolic resins. Also, the phenolic resin foam of the present invention is useful as a lining material or heat-insulating material.

SPECIFIC EXAMPLES OF THE INVENTION

The features and advantages of the present invention will be further illustrated by the examples set forth below. However, the examples are only illustrative and should in no way be interpreted as limiting the scope of the present invention.

In the examples compression strength (kg/cm$^2$) was measured by compressing a specimen (50×50×50 mm) in a vertical direction so as to reduce the original volume of the specimen by 10%. For flame resistance, the combustion time (second) and the combustion length (mm) of the specimen were measured in accordance with ASTM D 1692. Also, the coefficient of smoke generation ($C_A$), the flame-retaining time, the weight remaining ratio of the weight of the tested specimen to the original weight of the specimen, and the exhaust temperature (Td$\theta$), were measured in accordance with Japan Industrial Standard (JIS) A-1321, wherein test specimens had a length of 220 mm, a width of 220 mm, and a thickness of 30 mm. After the combustion test, it was observed how the specimen was cracked and deformed.

EXAMPLE 1

A 357 g amount of phenol, 174 g of paraformaldehyde, and a catalyst consisting of 1.5 g of lead naphthenate and 3.0 g of zinc naphthenate were mixed to form a homogeneous mass and then were heated at a temperature of from 110° C. to 114° C. for 3 hours while stirring. Immediately after the reaction was completed, the reaction mixture was dehydrated under reduced pressure. A benzylic ether type phenolic resin having a viscosity of 30,000 cps measured at a temperature of 25° C. was obtained.

A mixture of 100 g of the benzylic ether type phenolic resin, 1 g of a nonionic surfactant made and sold by Kao-Atras K.K., under their trademark "Tween-40", and 10 g of a blowing agent comprising, as a main component, trichloromonofluoromethane and made and sold by Mitsui Fluorochemical K.K., under their trademark "Fleon R-11" were stirred to provide a homogeneous resinous mixture. The mixture was added with 20 g of a hardening agent consisting of a 70% aqueous solution of p-toluene sulfonic acid and 10 g of a polyisocyanate component consisting of crude diphenylmethane diisocyanate, and made by Nippon Polyurethane Co. Ltd., under their trademark "Millionate MR-200". The admixture was vigorously stirred by using a rotation mixer at a speed of 3000 to 4000 rpm for 15 seconds. The stirred admixture was poured into a mold. The mold was placed in a heating chamber at a temperature of from 60° C. to 80° C. for 30 minutes so as to cause the admixture to foam and solidify. A foam was obtained without shrinkage thereof. The foam had no friable surface layer and exhibited a satisfactory mechanical property.

The foam was subjected to the combustion test in accordance with ASTM-D-1692 and to the smoke-generation test in accordance with JIS-A-1321. The results are indicated in Table 1.

TABLE 1

| Item | Value |
|---|---|
| Foam density (kg/m$^3$) | 25.7 |
| 10% Compression strength (kg/cm$^2$) | 0.90 |
| ASTM-D-1692 Test | |
| Combustion time (sec) | 28 |
| Combustion length (mm) | 18 |
| JIS-A-1321 Test | |
| $C_A$ | 15 |
| Flame-remaining time (sec) | 8 |
| Weight-retaining ratio (%) | 55 |
| Td$\theta$ | 60 |
| Cracks and deformation | none |

EXAMPLES 2 THROUGH 7 AND COMPARATIVE EXAMPLES 1 AND 2

In each of Examples 2 through 7 and Comparative Examples 1 and 2, the same procedures as those described in Example 1 were carried out except that a surfactant of the type and in the amount indicated in Table 2 was used, the polyisocyanate component was used in the amount indicated in Table 2, and an additive of the type and in the amount indicated in Table 2 was added to the resinous mixture. The properties of the resultant foam are indicated in Table 2.

In Examples 2 through 7, the resultant foams exhibited substantially no friability and shrinkage, satisfactory flame resistance, and very small smoke generation.

TABLE 2

| Item | Example No. | | | | | | Comparative Example No. | |
|---|---|---|---|---|---|---|---|---|
| | 2 | 3 | 4 | 5 | 6 | 7 | 1 | 2 |
| Phenolic resin (part by wt) | 100 | 100 | 100 | 100 | 100 | 100 | 100 | 100 |
| Surfactant (part by wt) | | | | | | | | |
| Tween-40 | 1 | 1 | 1 | — | 1 | 1 | 1 | 1 |
| SH-193(*)$^1$ | — | — | — | 3 | — | — | — | — |
| Blowing agent (Fleon R-11) (part by wt) | 10 | 10 | 10 | 10 | 10 | 10 | 10 | 10 |
| Polyisocyanate (Millionate MR-200) (part by wt) | 5 | 10 | 10 | 10 | 7(*)$^2$ | 10 | — | — |
| Additive (part by wt) | | | | | | | | |
| PEG-400(*)$^3$ | — | — | 10 | 10 | 10 | 5 | — | 5 |
| Triethanolamine | — | — | — | — | — | 5 | — | 5 |
| 70% Hardening agent aqueous solution (part by wt) | 20 | 20 | 20 | 20 | 20 | 20 | 20 | 20 |
| Water | 6 | 6 | 6 | 6 | 6 | 6 | 6 | 6 |
| Ratio [NCO]/[SO$_3$H] | 0.4 | 0.9 | 0.9 | 0.9 | 1.0 | 0.9 | | |
| Resultant foam | Satisfactory | | | | | | Low density and very high friability | Spongy and large shrinkage |

Note:
(*)$^1$Nonionic surfactant made and sold by Toray Silicone K.K., under their trademark "Toray Silicone SH-193"
(*)$^2$Tolylene diisocyanate made and sold by Nippon Plyurethane Co., Ltd. under their trademark "T-80"
(*)$^3$Polyoxyethylenediol made and sold by Nippon Oils and Fats Co., Ltd. under their trademark "Nissan PGE-400"

EXAMPLE 8

The same procedures as those described in Example 1 were carried out except that the surfactant (Tween-40) was used in an amount of 3 g, the 70% p-toluene sulfonic acid aqueous solution was used in an amount of 70 g, and the crude diphenylmethane diisocyanate was used in an amount of 4.0 g.

The resultant foam exhibited no friability and shrinkage and satisfactory mechanical strength. The properties of the foam are shown in Table 3.

TABLE 3

| Item | Value |
|---|---|
| Foam density (kg/m$^3$) | 28.9 |
| 10% Compression strength (kg/cm$^2$) ASTM-D-1692 Test | 0.95 |
| Combustion time (sec) | 22 |
| Combustion length (mm) JIS-A-1321 Test | 14 |
| $C_A$ | 12 |
| Flame-retaining time (sec) | 23 |
| Weight-remaining ratio (%) | 52 |
| Td$\theta$ | 47 |
| Cracks and deformation | None |

EXAMPLES 9 THROUGH 17 AND COMPARATIVE EXAMPLES 3 AND 4

In each of Examples 9 through 17 and Comparative Examples 3 and 4, the same procedures as those described in Example 8 were carried out except that a surfactant was used of the type and in the amount indicated in Table 4, the blowing agent was used in the amount indicated in Table 4, an additive was used of the type and in the amount indicated in Table 4, the polyisocyanate component was used of the type and in the amount indicated in Table 4, and the 70% hardening agent aqueous solution was used in the amount indicated in Table 4.

EXAMPLES 18 AND 19 AND COMPARATIVE EXAMPLES 5 AND 6

In Example 18, the same procedures as those described in Example 8 were carried out except that, on the bottom of the mold, a piece of K liner paper was placed so that the resultant phenolic resin foam adhered to the paper. The adhered foam was subjected to a peeling resistance test at a peeling angle of 90 degrees.

The result is shown in Table 5.

In Example 19, the same procedures as those described in Example 18 were carried out except that a mold steel plate (JIS G-3141, SPCC-SB) was used in place of the K liner paper. The peeling resistance of the resultant adhered foam was as indicated in Table 5.

In Comparison Examples 5 and 6, the same procedures as those described in Examples 18 and 19, respectively, were carried out except that the benzylic ether type phenolic resin was replaced by a resol type phenolic resin which was prepared by reacting 940 g of phenol with 1460 g of a 37% formaldehyde aqueous solution in the presence of 24 g of sodium hydroxide and which had a viscosity of 9,500 cps at 20° C. and a water content of 12.5%. The results of the peeling strength test are indicated in Table 5.

TABLE 5

| Example No. | | Material | Peeling resistance (kg/3 cm) |
|---|---|---|---|
| Example | 18 | K liner paper | 0.6 |
|  | 19 | Mild steel plate | 0.9 |
| Comparative | 5 | K liner paper | 0.1 |
| Example | 6 | Mild steel plate | 0.1 |

Table 5 shows that the peeling resistance (bonding strength) of the benzylic ether type phenolic resin foams of the present invention to sheet materials is six to nine times that of the resol type phenolic resin foam.

We claim:

TABLE 4

| | Example No. | | | | | | | | | Comparative Example | |
|---|---|---|---|---|---|---|---|---|---|---|---|
| Item | 9 | 10 | 11 | 12 | 13 | 14 | 15 | 16 | 17 | 3 | 4 |
| Phenolic resin (part by wt) | 100 | 100 | 100 | 100 | 100 | 100 | 100 | 100 | 100 | 100 | 100 |
| Surfactant (part by wt) | | | | | | | | | | | |
| Tween-40 | 3 | 3 | 3 | 3 | — | 3 | 3 | 3 | 3 | 3 | 3 |
| SH-193 | — | — | — | — | 3 | — | — | — | — | — | — |
| Blowing agent (Fleon R-11) (part by wt) | 25 | 15 | 5 | 20 | 10 | 5 | 5 | 5 | 10 | 10 | 10 |
| Additive | | | | | | | | | | | |
| PEG-400 | — | — | — | 10 | 5 | 10 | 5 | 10 | — | — | 5 |
| Triethanolamine | — | — | — | — | — | — | 5 | — | — | — | 5 |
| Polyisocyanate (Millionate MR-200) (part by wt) | 4 | 7.5 | 25 | 8 | 5 | 10(*)4 | 20 | 10 | 30 | — | — |
| 70% Hardening agent aqueous solution (part by wt) | 70 | 30 | 50 | 70 | 15 | 20 | 40 | 25(*)5 | 119 | 20 | 20 |
| Ratio [NCO]/[SO$_3$H] | 0.1 | 0.45 | 0.9 | 0.2 | 0.6 | 0.9 | 0.9 | 0.9 | 0.45 | — | — |
| Water | 21 | 9 | 15 | 21 | 4.5 | 6 | 12 | 5 | 35.7 | 6 | 6 |
| Resultant foam | | | | Satisfactory | | | | | | Very friable and low density | Spongy and large shrinkage |

Note:
(*)4Tolylenediisocyanate
(*)5Mixture of 5 parts by weight of an 85% phosphoric acid aqueous solution with 20 parts by weight of a 70% p-toluene sulfonic acid aqueous solution In Examples 9 through 17, the resultant forms exhibited substantially no friability and shrinkage, excellent flame resistance, and low smoke generation.

1. A benzylic ether type phenol-formaldehyde resin foam comprising a reaction product of a mixture comprising:
   (A) 100 parts by weight of at least one benzylic ether type phenol-formaldehyde resin;

(B) 1 part to 50 parts by weight of a blowing agent;
(C) 5 parts to 150 parts by weight of a hardening agent consisting of at least one aromatic sulfonic acid compound;
(D) 1 part to 50 parts by weight of a polyisocyanate component consisting of at least one polyisocyanate compound; and
(E) 0.1 part to 100 parts by weight of water, wherein said polyisocyanate component and said hardening agent contained in said mixture are in amounts satisfying the relationship $$0.1 \leq [NCO]/[SO_3H] \leq 1.0$$

wherein [NCO] represents the gram equivalent of NCO groups in the polyisocyanate compound molecules and [SO$_3$H] represents the gram equivalent of SO$_3$H groups in the aromatic sulfonic acid compound molecules.

2. The phenolic resin foam as claimed in claim 1, wherein said benzylic ether type phenolic resin is of the formula (I):

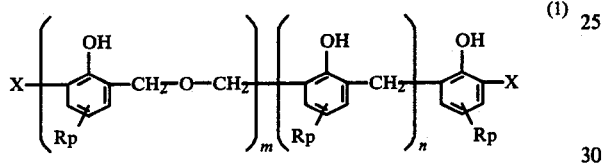

wherein R represents a member selected from the group consisting of a hydrogen atom, hydrocarbon radicals, oxyhydrocarbon radicals, and halogen atoms; X represents a terminal group selected from the group consisting of a hydrogen atom and methylol radical, the molar ratio of the methylol terminal group to the hydrogen terminal group being at least 1; and m and n represent an integer, respectively, the sum of m and n being at least 2 and the ratio of m to n being at least 1, and p represents an integer from 1 to 3.

3. The phenolic resin foam as claimed in claim 1, wherein said blowing agent comprises at least one member selected from the group consisting of aliphatic hydrocarbons and their halides having a low boiling point of 85° C. or less.

4. The phenolic resin foam as claimed in claim 1, wherein said blowing agent comprises at least one member selected from the group consisting of petroleum ether, n-hexane, n-heptane, methylene chloride, trichloromonofluoromethane, and dichlorodifluoromethane.

5. The phenolic resin foam as claimed in claim 1, wherein said aromatic sulfonic acid compound is selected from the group consisting of benzene sulfonic acid, toluene sulfonic acid, xylene sulfonic acid, and phenol sulfonic acid.

6. The phenolic resin foam as claimed in claim 1, wherein said polyisocyanate compound is selected from the group consisting of aliphatic, cycloaliphatic, and aromatic polyisocyanates and prepolymer of at least one of the above-mentioned polyisocyanates with at least one polyol compound selected from polyhydric alcohols, polyether polyols, and polyester polyols.

7. The phenolic resin foam as claimed in claim 1, wherein said mixture contains at least one additive selected from surfactants, agents for enhancing mechanical properties of the resultant foam, and flame retardants.

8. The phenolic resin foam as claimed in claim 7, wherein said surfactant is a nonionic surfactants.

9. The phenolic resin foam as claimed in claim 7, wherein said surfactant is in an amount of from 1 to 5 parts by weight per 100 parts by weight of said benzylic ether type phenolic resin.

10. A process for producing a benzylic ether type phenol-formaldehyde resin foam comprising:
(A) mixing 100 parts by weight of at least one benzylic ether type phenyl-formaldehyde resin with
(B) 1 part to 50 parts by weight of a blowing agent, and then, with at least a hardening agent comprising at least one aromatic sulfonic acid compound, a polyisocyanate component consisting of at least one polyisocyanate compound, and water; and
(C) 5 parts to 150 parts by weight of a hardening agent comprising at least one aromatic sulfonic acid compound;
(D) 1 part to 50 parts by weight of a polyisocyanate component consisting of at least one polyisocyanate compound; and
(E) 0.1 parts to 100 parts by weight of water, wherein said polyisocyanate component and said hardening agent contained in the resulting mixture are in amounts satisfying the relationship:

$$0.1 \leq [NCO]/[SO_3H] \leq 1.0$$

wherein [NCO] represents the gram equivalent of NCO groups in the polyisocyanate compound molecules and [SO$_3$H] represents the gram equivalent of SO$_3$H groups in the aromatic sulfonic acid compound molecules; and
(F) letting said mixture stand at room temperature or above to allow the mixture to foam and solidify.

11. The process as claimed in claim 10, wherein said foaming and solidifying procedure is carried out at a temperature of from 60° C. to 80° C.

12. The process as claimed in claim 10, wherein said benzylic ether type phenolic resin is of the formula (I):

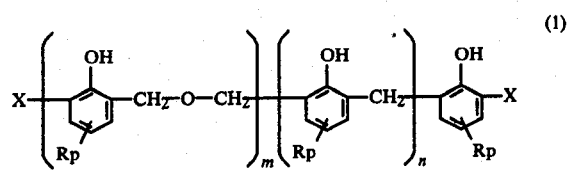

wherein R represents a member selected from the group consisting of a hydrogen atom, hydrocarbon radicals, oxyhydrocarbon radicals, and halogen atoms; X represents a terminal group selected from the group consisting of a hydrogen atom and methylol radical, the molar ratio of the methylol terminal group to the hydrogen terminal group being at least 1; and m and n represent an integer, respectively, the sum of m and n being at least 2 and the ratio of m to n being at least 1, and p represents an integer from 1 to 3.

13. The process as claimed in claim 1, wherein said blowing agent comprises at least one member selected from the group consisting of aliphatic hydrocarbons and their halides having a low boiling point of 85° C. or less.

14. The process as claimed in claim 1, wherein said blowing agent comprises at least one member selected from the group consisting of petroleum ether, n-hexane, n-heptane, methylene chloride, trichloromonofluoromethane, and dichlorodifluoromethane.

15. The process as claimed in claim 1, wherein said aromatic sulfonic acid compound is selected from the group consisting of benzene sulfonic acid, toluene sulfonic acid, xylene sulfonic acid, and phenol sulfonic acid.

16. The process as claimed in claim 1, wherein said polyisocyanate compound is selected from the group consisting of aliphatic, cycloaliphatic, and aromatic polyisocyanates and prepolymer of at least one of the above-mentioned polyisocyanates with at least one polyol compound selected from polyhydric alcohols, polyether polyols, and polyester polyols.

17. The process as claimed in claim 10, wherein said mixture contains at least one additive selected from surfactants, agents for enhancing mechanical properties of the resultant foam, and flame retardants.

18. The process as claimed in claim 17, wherein said surfactant is a nonionic surfactant.

19. The process as claimed in claim 17, wherein said surfactant is in an amount of from 1 to 5 parts by weight per 100 parts by weight of said benzylic ether type phenolic resin.

* * * * *